United States Patent
Ringold (10) Patent No.: US 8,489,415 B1
(45) Date of Patent: Jul. 16, 2013

(54) SYSTEMS AND METHODS FOR THE COORDINATION OF BENEFITS IN HEALTHCARE CLAIM TRANSACTIONS

(75) Inventor: James Morgan Ringold, Lawrenceville, GA (US)

(73) Assignee: McKesson Financial Holdings Limited, Hamilton (BM)

(*) Notice: Subject to any disclaimer, the term of this patent is extended or adjusted under 35 U.S.C. 154(b) by 532 days.

(21) Appl. No.: 12/570,953

(22) Filed: Sep. 30, 2009

(51) Int. Cl.
*G06Q 10/00* (2012.01)
*G06F 17/60* (2006.01)

(52) U.S. Cl.
USPC .................................. 705/2; 705/4

(58) Field of Classification Search
USPC .......................................................... 705/2
See application file for complete search history.

(56) References Cited

U.S. PATENT DOCUMENTS

| | | |
|---|---|---|
| 4,674,041 A | 6/1987 | Lemon et al. |
| 4,723,212 A | 2/1988 | Mindrum et al. |
| 4,910,672 A | 3/1990 | Off et al. |
| 5,007,641 A | 4/1991 | Seidman |
| 5,080,364 A | 1/1992 | Seidman |
| 5,173,851 A | 12/1992 | Off et al. |
| 5,201,010 A | 4/1993 | Deaton et al. |
| 5,235,702 A | 8/1993 | Miller |
| 5,237,620 A | 8/1993 | Deaton et al. |
| 5,301,105 A | 4/1994 | Cummings |
| 5,305,196 A | 4/1994 | Deaton et al. |
| 5,327,508 A | 7/1994 | Deaton et al. |
| 5,359,509 A | 10/1994 | Little et al. |
| 5,388,165 A | 2/1995 | Deaton et al. |
| 5,430,644 A | 7/1995 | Deaton et al. |
| 5,448,471 A | 9/1995 | Deaton et al. |
| 5,544,044 A | 8/1996 | Leatherman |
| 5,550,734 A | 8/1996 | Tarter et al. |
| 5,588,649 A | 12/1996 | Blumberg et al. |

(Continued)

FOREIGN PATENT DOCUMENTS

| | | |
|---|---|---|
| CA | 2482370 | 3/2006 |
| EP | 1310895 A2 | 11/2002 |

(Continued)

OTHER PUBLICATIONS

Sampson, R.J., Taking Control of Health Care Costs, Best's Review—Life Health Insurance Edition, Nov. 1983, pp. 64-66, vol. 84, Issue 7, USA.

(Continued)

*Primary Examiner* — Hiep V Nguyen
(74) *Attorney, Agent, or Firm* — Sutherland Asbill & Brennan LLP (57) ABSTRACT

Systems and methods for the coordination of benefits in healthcare claim transactions are provided. A healthcare claim request including information associated with a plurality of prescription claims for a single healthcare transaction may be received from a healthcare provider computer and identified as a bundled healthcare claim request. A primary claim request for the healthcare transaction may be generated and communicated to a first claims processor computer for adjudication, and a first adjudicated reply may be received from the first claims processor computer. Based at least in part on the received first adjudicated reply, a secondary claim request for the healthcare transaction may be generated and communicated to a second claims processor computer for adjudication. A second adjudicated reply may be received from the second claims processor, and information associated with the first adjudicated reply and the second adjudicated reply may be communicated to the healthcare provider computer.

18 Claims, 4 Drawing Sheets

U.S. PATENT DOCUMENTS

| | | | |
|---|---|---|---|
| 5,592,560 A | 1/1997 | Deaton et al. |
| 5,612,868 A | 3/1997 | Off et al. |
| 5,621,812 A | 4/1997 | Deaton et al. |
| 5,628,530 A | 5/1997 | Thornton |
| 5,638,457 A | 6/1997 | Deaton et al. |
| 5,642,485 A | 6/1997 | Deaton et al. |
| 5,644,723 A | 7/1997 | Deaton et al. |
| 5,644,778 A | 7/1997 | Burks et al. |
| 5,649,114 A | 7/1997 | Deaton et al. |
| 5,659,469 A | 8/1997 | Deaton et al. |
| 5,675,662 A | 10/1997 | Deaton et al. |
| 5,687,322 A | 11/1997 | Deaton et al. |
| 5,704,044 A | 12/1997 | Tarter et al. |
| 5,748,907 A | 5/1998 | Crane |
| 5,749,907 A | 5/1998 | Mann |
| 5,832,447 A | 11/1998 | Rieker et al. |
| 5,832,457 A | 11/1998 | O'Brien |
| 5,845,255 A | 12/1998 | Mayaud |
| 5,857,175 A | 1/1999 | Day et al. |
| 5,892,827 A | 4/1999 | Beach et al. |
| 5,892,900 A | 4/1999 | Ginter et al. |
| 5,915,007 A | 6/1999 | Klapka |
| 5,926,795 A | 7/1999 | Williams |
| 5,950,169 A | 9/1999 | Borghesi et al. |
| 5,956,736 A | 9/1999 | Hanson et al. |
| 5,963,915 A | 10/1999 | Kirsch |
| 5,970,469 A | 10/1999 | Scroggie et al. |
| 5,974,399 A | 10/1999 | Giuliani et al. |
| 5,991,750 A | 11/1999 | Watson |
| 6,006,242 A | 12/1999 | Poole et al. |
| 6,012,035 A | 1/2000 | Freeman et al. |
| 6,014,634 A | 1/2000 | Scroggie et al. |
| 6,021,392 A | 2/2000 | Lester et al. |
| 6,026,370 A | 2/2000 | Jermyn |
| 6,041,309 A | 3/2000 | Laor |
| 6,055,573 A | 4/2000 | Gardenswartz et al. |
| 6,067,069 A | 5/2000 | Krause |
| 6,067,524 A | 5/2000 | Byerly et al. |
| 6,073,104 A | 6/2000 | Field |
| 6,185,541 B1 | 2/2001 | Scroggie et al. |
| 6,195,612 B1 | 2/2001 | Pack-Harris |
| 6,202,923 B1 | 3/2001 | Boyer et al. |
| 6,205,455 B1 | 3/2001 | Umen |
| 6,208,973 B1 | 3/2001 | Boyer et al. |
| 6,224,387 B1 | 5/2001 | Jones |
| 6,240,394 B1 | 5/2001 | Uecker |
| 6,260,758 B1 | 7/2001 | Blumberg |
| 6,278,979 B1 | 8/2001 | Williams |
| 6,282,516 B1 | 8/2001 | Giuliani |
| 6,298,330 B1 | 10/2001 | Gardenswartz et al. |
| 6,304,849 B1 | 10/2001 | Uecker et al. |
| 6,307,940 B1 | 10/2001 | Yamamoto et al. |
| 6,307,958 B1 | 10/2001 | Deaton et al. |
| 6,321,210 B1 | 11/2001 | O'Brien et al. |
| 6,324,516 B1 | 11/2001 | Shults et al. |
| 6,330,546 B1 | 12/2001 | Gopinathan et al. |
| 6,334,108 B1 | 12/2001 | Deaton et al. |
| 6,341,265 B1 | 1/2002 | Provost et al. |
| 6,343,271 B1 | 1/2002 | Peterson et al. |
| 6,351,735 B1 | 2/2002 | Deaton et al. |
| 6,377,935 B1 | 4/2002 | Deaton et al. |
| 6,424,949 B1 | 7/2002 | Deaton et al. |
| 6,427,020 B1 | 7/2002 | Rhoads |
| 6,484,146 B2 | 11/2002 | Day et al. |
| 6,584,448 B1 | 6/2003 | Laor |
| 6,632,251 B1 | 10/2003 | Rutten et al. |
| 6,671,692 B1 | 12/2003 | Marpe et al. |
| 6,671,693 B1 | 12/2003 | Marpe et al. |
| 6,684,195 B1 | 1/2004 | Deaton et al. |
| 6,714,918 B2 | 3/2004 | Hillmer et al. |
| 6,757,898 B1 | 6/2004 | Ilsen et al. |
| 6,769,228 B1 | 8/2004 | Mahar |
| 6,795,809 B2 | 9/2004 | O'Brien et al. |
| 6,879,959 B1 | 4/2005 | Chapman et al. |
| 6,885,994 B1 | 4/2005 | Scroggie et al. |
| 7,013,284 B2 | 3/2006 | Guyan et al. |
| 7,024,374 B1 | 4/2006 | Day et al. |
| 7,058,584 B2 | 6/2006 | Kosinski et al. |
| 7,058,591 B2 | 6/2006 | Giuliani et al. |
| 7,111,173 B1 | 9/2006 | Scheidt |
| 7,155,397 B2 | 12/2006 | Alexander et al. |
| 7,225,052 B2 | 5/2007 | Foote et al. |
| 7,228,285 B2 | 6/2007 | Hull et al. |
| 7,233,913 B2 | 6/2007 | Scroggie et al. |
| 7,309,001 B2 | 12/2007 | Banfield et al. |
| 7,356,460 B1 | 4/2008 | Kennedy et al. |
| 7,380,707 B1 | 6/2008 | Fredman |
| 7,401,027 B2 | 7/2008 | Moore et al. |
| 7,415,426 B2 | 8/2008 | Williams et al. |
| 7,418,400 B1 | 8/2008 | Lorenz |
| 7,426,480 B2 | 9/2008 | Granger et al. |
| 7,685,006 B2 | 3/2010 | Rahn et al. |
| 7,917,378 B2 * | 3/2011 | Fitzgerald et al. ............ 705/4 |
| 8,321,243 B1 | 11/2012 | Harris, Sr. et al. |
| 2001/0001014 A1 | 5/2001 | Akins, III et al. |
| 2001/0032099 A1 | 10/2001 | Joao |
| 2001/0037216 A1 | 11/2001 | Oscar et al. |
| 2001/0037224 A1 | 11/2001 | Eldridge et al. |
| 2001/0041993 A1 | 11/2001 | Campbell |
| 2002/0002495 A1 | 1/2002 | Ullman |
| 2002/0032583 A1 | 3/2002 | Joao |
| 2002/0035488 A1 | 3/2002 | Aquila et al. |
| 2002/0044043 A1 | 4/2002 | Chaco et al. |
| 2002/0049617 A1 | 4/2002 | Lencki et al. |
| 2002/0055856 A1 | 5/2002 | Adams |
| 2002/0065687 A1 | 5/2002 | Onoue |
| 2002/0087554 A1 | 7/2002 | Seelinger |
| 2002/0087583 A1 | 7/2002 | Morgan et al. |
| 2002/0111832 A1 | 8/2002 | Judge |
| 2002/0120473 A1 | 8/2002 | Wiggins |
| 2002/0128883 A1 | 9/2002 | Harris |
| 2002/0133503 A1 | 9/2002 | Amar et al. |
| 2002/0138593 A1 | 9/2002 | Novak et al. |
| 2002/0175370 A1 | 11/2002 | Bockelman |
| 2002/0183979 A1 | 12/2002 | Wildman |
| 2002/0198831 A1 | 12/2002 | Patricelli et al. |
| 2003/0009357 A1 | 1/2003 | Pish |
| 2003/0009367 A1 | 1/2003 | Morrison |
| 2003/0028404 A1 | 2/2003 | Herron et al. |
| 2003/0050799 A1 | 3/2003 | Jay et al. |
| 2003/0074218 A1 | 4/2003 | Liff et al. |
| 2003/0074222 A1 | 4/2003 | Rosow et al. |
| 2003/0083903 A1 | 5/2003 | Myers |
| 2003/0120588 A1 | 6/2003 | Dodd et al. |
| 2003/0125986 A1 | 7/2003 | Collosi |
| 2003/0149594 A1 | 8/2003 | Beazley et al. |
| 2003/0149625 A1 | 8/2003 | Leonardi et al. |
| 2003/0154163 A1 | 8/2003 | Phillips et al. |
| 2003/0229540 A1 | 12/2003 | Algiene |
| 2004/0006490 A1 | 1/2004 | Gingrich et al. |
| 2004/0019464 A1 | 1/2004 | Martucci et al. |
| 2004/0039599 A1 | 2/2004 | Fralic |
| 2004/0046020 A1 | 3/2004 | Andreasson et al. |
| 2004/0049422 A1 | 3/2004 | Mortimer |
| 2004/0054657 A1 | 3/2004 | Takeyama |
| 2004/0073457 A1 | 4/2004 | Kalies |
| 2004/0078234 A1 | 4/2004 | Tallal, Jr. |
| 2004/0093242 A1 | 5/2004 | Cadigan et al. |
| 2004/0107117 A1 | 6/2004 | Denny |
| 2004/0111277 A1 | 6/2004 | Pearson et al. |
| 2004/0111291 A1 | 6/2004 | Dust et al. |
| 2004/0117323 A1 | 6/2004 | Mindala |
| 2004/0148198 A1 | 7/2004 | Kalies |
| 2004/0153336 A1 | 8/2004 | Virdee et al. |
| 2004/0172281 A1 | 9/2004 | Stanners |
| 2004/0172313 A1 * | 9/2004 | Stein et al. ............ 705/4 |
| 2004/0188998 A1 | 9/2004 | Henthorn |
| 2004/0249745 A1 | 12/2004 | Baaren |
| 2005/0015280 A1 | 1/2005 | Gabel et al. |
| 2005/0033604 A1 | 2/2005 | Hogan |
| 2005/0033610 A1 | 2/2005 | Cunningham |
| 2005/0060201 A1 | 3/2005 | Connely et al. |
| 2005/0065821 A1 | 3/2005 | Kalies |
| 2005/0086081 A1 | 4/2005 | Brock-Fisher |
| 2005/0090425 A1 | 4/2005 | Reardan et al. |
| 2005/0102169 A1 | 5/2005 | Wilson |
| 2005/0102170 A1 | 5/2005 | Lefever et al. |

| | | | |
|---|---|---|---|
| 2005/0125292 | A1 | 6/2005 | Kassab et al. |
| 2005/0154627 | A1 | 7/2005 | Zuzek et al. |
| 2005/0171815 | A1 | 8/2005 | Vanderveen |
| 2005/0187793 | A1 | 8/2005 | Myles |
| 2005/0197862 | A1 | 9/2005 | Paterson et al. |
| 2005/0240473 | A1 | 10/2005 | Ayers |
| 2005/0288972 | A1 | 12/2005 | Marvin et al. |
| 2006/0015518 | A1 | 1/2006 | Eletreby et al. |
| 2006/0020514 | A1 | 1/2006 | Yered |
| 2006/0026041 | A1 | 2/2006 | Ullman et al. |
| 2006/0085230 | A1 | 4/2006 | Brill et al. |
| 2006/0149587 | A1 | 7/2006 | Hill, Sr. et al. |
| 2006/0149784 | A1 | 7/2006 | Tholl et al. |
| 2006/0184391 | A1 | 8/2006 | Barre et al. |
| 2006/0224415 | A1 | 10/2006 | Hudson et al. |
| 2006/0229915 | A1 | 10/2006 | Kosinski et al. |
| 2006/0247948 | A1 | 11/2006 | Ellis et al. |
| 2006/0259363 | A1 | 11/2006 | Jhetam |
| 2006/0271398 | A1 | 11/2006 | Belcastro |
| 2006/0271405 | A1 | 11/2006 | Cipolle et al. |
| 2006/0287886 | A1 | 12/2006 | Kitazawa |
| 2007/0005402 | A1 | 1/2007 | Kennedy et al. |
| 2007/0050209 | A1 | 3/2007 | Yered |
| 2007/0050219 | A1 | 3/2007 | Sohr et al. |
| 2007/0088567 | A1 | 4/2007 | Berkelhamer et al. |
| 2007/0088576 | A1 | 4/2007 | de Beus et al. |
| 2007/0124177 | A1 | 5/2007 | Engleson et al. |
| 2007/0136100 | A1 | 6/2007 | Daugherty et al. |
| 2007/0179957 | A1 | 8/2007 | Gibson et al. |
| 2007/0233525 | A1 | 10/2007 | Boyle |
| 2007/0233526 | A1 | 10/2007 | Hoffman et al. |
| 2007/0239493 | A1 | 10/2007 | Sweetland et al. |
| 2008/0027759 | A1 | 1/2008 | Flam et al. |

FOREIGN PATENT DOCUMENTS

| | | |
|---|---|---|
| WO | WO9106917 A1 | 5/1991 |
| WO | 9503569 | 2/1995 |
| WO | WO9725682 A1 | 7/1997 |
| WO | WO9850871 A1 | 11/1998 |
| WO | 0039737 | 7/2000 |
| WO | 2007025295 | 3/2007 |

OTHER PUBLICATIONS

Anonymous, ACS to Demonstrate Electronic Health Record Solution Suite at MMIS 2007 Conference; EHR Tools Consolidate Data, Provide Useful Information at the Point of Care for Medicaid Providers, Payers, and Patients, PR Newswire, Aug. 13, 2007, New York, NY, USA.

Lamb, J., New Era of Electronic Medicine Management: E-Prescriptions, Britain's Traditionally Cautious National Health Service is Starting Trials for Online Prescription, with the Aim of Cutting Costs. Financial Times, London, Feb. 21, 2001, p. 6, London, United Kingdom.

Anonymous, Pharmacy Industry Leaders Launch Firm to Supply Real-Time Data. PR Newswire. Jul. 30, 2001, p. 1, New York, NY, USA.

Anonymous, Medic: On-line Goes In-House, Chain Store Age Executive, Jan. 1987, pp. 128-132. vol. 63, Issue 1, USA.

Anonymous, TechRx Announces Successful Beta Deployment of T-Rex. PR Newswire. May 13, 2002.

"Two automatic identification technology, neither new in the sense if being recent developments . . . " Patient Safety & Quality Healthcare [Online] Aug. 2005. URL: http://www.awarix.com.

"Subnotebooks, Phones, and More. St. Vincent's Gets on Track." Mobile Health Data [Online], Nov. 19, 2004. URL: http://www.awarix.com.

"Coping with Information Overload." The News Source for Healthcare Information Technology [Online] Nov. 2004. URL: http://www.awarix.com.

"St. Vincent's first to use Birmingham startup's information system." The Birmingham News [Online] Apr. 11, 2005. URL: http://www.awarix.com.

"St. Vincent's is Digital Flagship" D. Lockridge; Birmingham Medical News [Online] Sep. 2005.

Non-Final Office Action for U.S. Appl. No. 12/705,921 mailed Jan. 17, 2012.

Non-Final Office Action for U.S. Appl. No. 12/644,232 mailed Dec. 8, 2011.

Non-final Office Action for U.S. Appl. No. 12/696,677 mailed Dec. 20, 2011.

Notice of Allowance and Fees Due for U.S. Appl. No. 12/705,921 mailed Aug. 21, 2012.

"Medi-Cal POS NCPDP Pharmacy Transaction Specifications Third Party Vendors"; May 2005.

Final Office Action for U.S. Appl. No. 12/644,232 mailed Mar. 28, 2012.

Final Office Action for U.S. Appl. No. 12/705,921 mailed Apr. 30, 2012.

Final Office Action for U.S. Appl. No. 12/696,677 mailed May 2, 2012.

\* cited by examiner

SYSTEMS AND METHODS FOR THE COORDINATION OF BENEFITS IN HEALTHCARE CLAIM TRANSACTIONS

FIELD OF THE INVENTION

Aspects of the invention relate generally to healthcare transactions, and more particularly, to the coordination of benefits in healthcare claim transactions.

BACKGROUND OF THE INVENTION

During the processing of a healthcare transaction by a healthcare provider, such as a pharmacy or hospital, a healthcare claim, such as an insurance claim, is typically made by the healthcare provider in order to receive compensation for provided products and/or services. However, in many situations, a patient may have dual prescription coverage and/or multiple benefit payers. For example, a commercial insurance provider may cover all the cost of a medication except for a co-payment amount. A state provider, such as a Medicaid provider, may then cover the co-payment amount. In dual coverage situations, a healthcare provider must submit claims to each benefit provider separately and inform providers of amounts that have been paid by previous providers. Such individual claim submission may be time consuming for the healthcare provider and may be susceptible to inaccuracies as employees of the healthcare provider submit multiple claim requests.

Therefore, a need exists for systems and methods for the coordination of benefits in healthcare claim transactions.

BRIEF DESCRIPTION OF THE INVENTION

Some or all of the above needs and/or problems may be addressed by certain embodiments of the invention. Embodiments of the invention may include systems, methods, and apparatus for the coordination of benefits in healthcare claim transactions. In one embodiment, a computer-implemented method for the coordination of benefits in healthcare claim transactions is provided. A healthcare claim request may be received from a healthcare provider computer. The received healthcare claim request may include information associated with a plurality of prescription claims for a single healthcare transaction. The received healthcare claim request may be identified as a bundled healthcare claim request. A primary claim request for the healthcare transaction may be generated and communicated to a first claims processor computer for adjudication. A first adjudicated reply for the primary claim request may be received from the first claims processor computer. Based at least in part on the received first adjudicated reply, a secondary claim request for the healthcare transaction may be generated and communicated to a second claims processor computer for adjudication. A second adjudicated reply for the secondary claim request may be received from the second claims processor computer. Information associated with the first adjudicated reply and the second adjudicated reply may be communicated to the healthcare provider computer.

In accordance with another embodiment of the invention, a system for the coordination of benefits in healthcare claim transactions is provided. The system may include at least one memory and at least one processor. The at least one memory may be operable to store computer-executable instructions. The at least one processor may be configured to access the at least one memory and execute the computer-executable instructions to: receive a healthcare claim request from a healthcare provider computer, the healthcare claim request comprising information associated with a plurality of prescription claims for a single healthcare transaction; identify the received healthcare claim request as a bundled healthcare claim request; generate a primary claim request for the healthcare transaction; communicate the generated primary claim request to a first claims processor computer for adjudication; receive, from the first claims processor computer, a first adjudicated reply for the primary claim request; generate, based at least in part on the received first adjudicated reply, a secondary claim request for the healthcare transaction; communicate the generated secondary claim request to a second claims processor computer for adjudication; receive, from the second claims processor computer, a second adjudicated reply for the secondary claim request; and communicate information associated the first adjudicated reply and the second adjudicated reply to the healthcare provider computer.

Additional systems, methods, apparatus, features, and aspects may be realized though the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention can provide systems, methods, apparatus, means, and/or mechanisms for the coordination of benefits in healthcare claim transactions. A healthcare provider computer, such as a pharmacy computer, may submit a bundled healthcare claim request to a service provider computer. The bundled healthcare claim request may contain information associated with multiple claims for a single healthcare transaction. The service provider computer may identify the bundled claim request as a bundled request and process the bundled request by generating multiple claims requests and routing or otherwise communicating each of the generated claim requests to a respective claims processor computer for adjudication. For example, a primary claim request for the healthcare transaction may be generated and communicated to a first claims processor computer for adjudication. A first adjudicated reply for the primary claim request may be received from the first claims processor computer. Based at least in part on the received first adjudicated reply, a secondary claim request for the healthcare transaction may be generated and communicated to a second claims processor computer for adjudication. A second adjudicated reply for the secondary claim request may be received from the second claims processor computer. Any number of claim requests may be generated for the healthcare transaction and communicated to appropriate claims processor computers for adjudication. Once the claim requests have been adjudicated, in certain embodiments, a bundled reply for the original healthcare claim request may be assembled or generated and returned to the healthcare provider computer. The bundled reply may include information associated with each of the adjudicated replies that are received by the service provider computer. In this regard, a healthcare provider may submit a single claim request to the service provider computer, and the service provider computer may coordinate the various benefit providers associated with the claim.

System Overview

Figure 1:
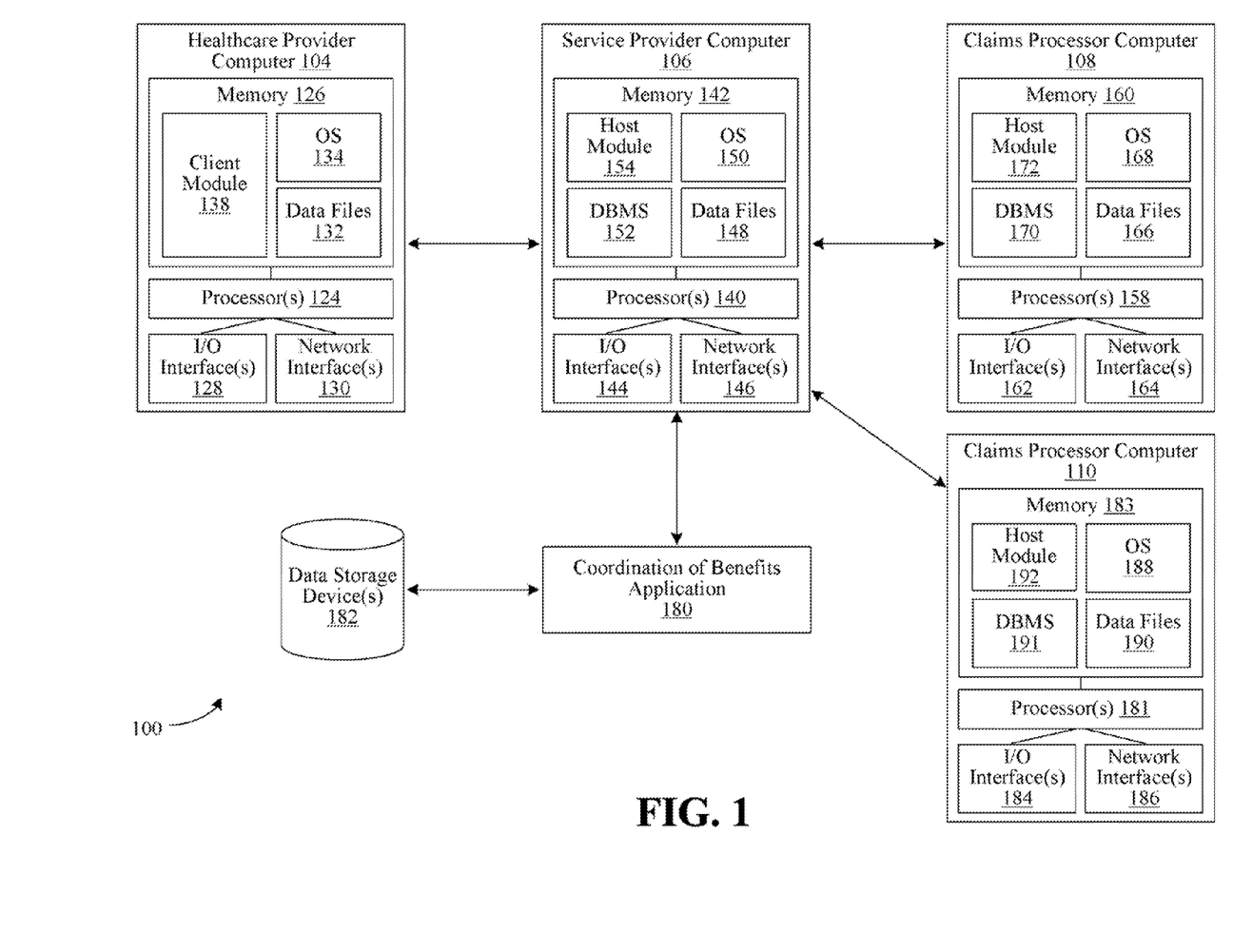
FIG. 1 illustrates an example overview of a system that facilitates the coordination of benefits in healthcare claim transactions, according to an example embodiment of the invention.

An example system 100 system for facilitating the coordination of benefits in healthcare claim transactions will now be described illustratively with respect to FIG. 1. As shown in FIG. 1, the system 100 may include at least one healthcare provider computer 104, at least one service provider computer 106, and any number of claims processor computers, such as a first claims processor computer 108 and a second claims processor computer 110. As desired, each of the healthcare provider computer 104, service provider computer 106, and/or claims processor computers 108, 110 may include one or more processing devices that may be configured for accessing and reading associated computer-readable media having stored thereon data and/or computer-executable instructions for implementing the various methods of the invention.

Additionally, in certain embodiments, the service provider computer 106 may include or otherwise be in communication with a coordination of benefits (COB) application 180 or COB module, which may facilitate the generation of multiple claim requests for a bundled healthcare claim request that has been received from a healthcare provider computer 104. For example, the COB application 180 may generate a primary claim request and one or more secondary claim requests for a healthcare transaction, and the COB application 180 may direct the communication of the various claim requests to appropriate claims processor computers 108, 110. The COB application 180 may additionally analyze information included in adjudicated replies that are received from the claims processor computers 108, 110 and utilize that information in the generation of claims requests, such as secondary claim requests. Additionally, as desired, the COB application 180 may generate or assembly a single adjudicated reply for the bundled healthcare claim request and direct the communication of the single adjudicated reply to the healthcare provider computer 104.

Generally, network devices and systems, including one or more of the healthcare provider computer 104, service provider computer 106, and claims processor computers 108, 110 may include or otherwise be associated with suitable hardware and/or software for transmitting and receiving data and/or computer-executable instructions over one or more communications links or networks. These network devices and systems may also include any number of processors for processing data and executing computer-executable instructions, as well as other internal and peripheral components that are well known in the art. Further, these network devices and systems may include or be in communication with any number of suitable memory devices operable to store data and/or computer-executable instructions. By executing computer-executable instructions, each of the network devices may form a special purpose computer or particular machine. As used herein, the term "computer-readable medium" describes any form of suitable memory or memory device.

The healthcare provider computer 104 may be associated with a healthcare provider, for example, a pharmacy, physician's office, hospital, etc. The healthcare provider computer 104 may be any suitable processor-driven device that facilitates the processing of healthcare requests made by patients or consumers and the communication of information associated with healthcare claim transactions or healthcare claim requests to the service provider computer 106. For example, the healthcare provider computer 104 may be a computing device that includes any number of server computers, mainframe computers, networked computers, desktop computers, personal computers, digital assistants, personal digital assistants, digital tablets, Internet appliances, application specific circuits, microcontrollers, minicomputers, and/or any other processor-based device(s). In certain embodiments, the healthcare provider computer 104 may be a suitable point of sale device associated with a healthcare provider. The execution of the computer-implemented instructions by the healthcare provider computer 104 may form a special purpose computer or other particular machine that is operable to facilitate the processing of healthcare requests made by patients and the communication of information associated with healthcare claim requests and/or healthcare claim transactions to a service provider computer 106. Additionally, in certain embodiments of the invention, the operations and/or control of the healthcare provider computer 104 may be distributed amongst several processing components.

In addition to having one or more processors 124, the healthcare provider computer 104 may include one or more memory devices 126, one or more input/output ("I/O") interface(s) 128, and one or more network interface(s) 130. The memory devices 126 may be any suitable memory devices, for example, caches, read only memory devices, random access memory devices, magnetic storage devices, removable storage devices, etc. The memory devices 126 may store data, executable instructions, and/or various program modules utilized by the healthcare provider computer 104, for example, data files 132, an operating system 134, and/or a client module 138. The data files 132 may include any suitable data that facilitates the receipt and/or processing of healthcare requests by the healthcare provider computer 104 and the generation and/or processing of healthcare claim requests or healthcare claim transactions that are communicated to the service provider computer 106. For example, the data files 132 may include, but are not limited to, healthcare information associated with one or more patients, information associated with the service provider computer 106, information associated with one or more claims processors, information associated with one or more healthcare claim transactions, and/or information associated with the generation of bundled healthcare claim requests. The operating system (OS) 134 may be a suitable software module that controls the general operation of the healthcare provider 104. The OS 134 may also facilitate the execution of other software modules by the one or more processors 124, for example, the client module 138. The OS 134 may be, but is not limited to, Microsoft Windows®, Apple OSX™, Linux, Unix, or a mainframe operating system. The client module 138 may be an Internet browser or other software, including a dedicated program, for interacting with the service provider computer 106. For example, a user such as a pharmacist or other pharmacy employee, may utilize the client module 138 in preparing and providing a prescription claim request to the service processor computer 106 for delivery to one or more appropriate claims processor computers 108, 110 for adjudication or other coverage/benefits determination. The healthcare provider computer 104 may also utilize the client module 138 to retrieve or otherwise receive data, messages, or responses from the service provider computer 106 and/or other components of the system 100.

In operation, the healthcare provider computer 104 may receive information associated with a healthcare request from a patient. As one example, the healthcare provider computer 104 may receive information associated with a healthcare request for a patient at a point of sale, such as in a pharmacy during a prescription fulfillment or purchase transaction. As another example, the healthcare provider computer 104 may electronic receive a healthcare request from a patient computer or other patient device. The healthcare provider computer 104 may generate a healthcare claim request, healthcare claim transaction, or prescription claim request for the patient request and information associated with the healthcare claim request may be communicated to the service provider computer 106. In various embodiments of the invention, the generated healthcare claim request may be a bundled request that identifies one or more benefits providers or payors for the healthcare transaction, such as a primary payor and one or more secondary payors. The healthcare claim request may further include a field, flag, setting, or other identifier that identifies the healthcare claim request as a bundled request. A wide variety of identifiers may be utilized as desired in various embodiments of the invention, for example, an other coverage code (OCC) for the healthcare claim request may be set to a certain value (e.g., nine) to identify the healthcare claim request as a bundled request.

The one or more I/O interfaces 128 may facilitate communication between the healthcare provider computer 104 and one or more input/output devices, for example, one or more user interface devices, such as, a display, keypad, control panel, touch screen display, remote control, microphone, etc. that facilitate user interaction with the healthcare provider computer 104. For example, the one or more I/O interfaces 128 may facilitate entry of information associated with a healthcare transaction or healthcare claim request by an employee of a healthcare provider, such as a pharmacy employee. The one or more network interfaces 130 may facilitate connection of the healthcare provider computer 104 to one or more suitable networks, for example, a local area network, a wide area network, the Internet, a cellular network, a publicly switched telephone network, a dedicated healthcare transactions network, any wired network, any wireless network, a combination of networks, etc. In this regard, the healthcare provider computer 104 may receive and/or communicate information to other network components of the system 100, such as the service provider computer 106.

With continued reference to FIG. 1, the service provider computer 106 may include, but is not limited to, any suitable processor-driven device that is configured for receiving, processing, and fulfilling requests from the healthcare provider computer 104 and/or claims processor computers 108, 110 relating to prescription, pharmacy, benefits, and/or healthcare transactions and/or other activities. In certain embodiments, the service provider computer 106 may be a switch/router that routes healthcare claim transactions and/or other healthcare requests. For example, the service provider computer 106 may route billing requests and/or prescription claim requests communicated from the healthcare provider computer 104 to one or more claims processor computers 108, 110, such as pharmacy benefits managers (PBM), insurers, government payors, or claims clearinghouses. In certain embodiments, the service provider computer 106 may include a suitable host server, host module, or other software that facilitates the receipt of a healthcare claim transaction from a healthcare provider computer 104 and/or the routing of components of the received healthcare claim transaction to various claims processor computers 108, 110.

The service provider computer 106 may include any number of special purpose computers or other particular machines, application specific circuits, microcontrollers, personal computers, minicomputers, mainframe computers, servers, networked computers, and/or other processor driven devices. In certain embodiments, the operations of the service provider computer 106 may be controlled by computer-executed or computer-implemented instructions that are executed by one or more processors associated with the service provider computer 106 to form a special purpose computer or other particular machine that is operable to facilitate the receipt, routing, and/or processing of healthcare claim requests or healthcare claim transactions. The one or more processors that control the operations of the service provider computer 106 may be incorporated into the service provider computer 106 and/or in communication with the service provider computer 106 via one or more suitable networks. In certain embodiments of the invention, the operations and/or control of the service provider computer 106 may be distributed amongst several processing components.

Similar to the healthcare provider computer 104, the service provider computer 106 may include one or more processors 140, one or more memory devices 142, one or more input/output ("I/O") interface(s) 144, and one or more network interfaces 146. The one or more memory devices 142 may be any suitable memory devices, for example, caches, read only memory devices, random access memory devices, magnetic storage devices, removable memory devices, etc. The one or more memory devices 142 may store data, executable instructions, and/or various program modules utilized by the service provider 106, for example, data files 148, an operating system ("OS") 150, the host module 154, and a database management system ("DBMS") 152 to facilitate management of data files 148 and other data stored in the memory devices 142 and/or one or more databases 182 or data storage devices. The OS 150 may be, but is not limited to, Microsoft Windows®, Apple OSX™, Linux, Unix, or a mainframe operating system.

According to an embodiment of the invention, the data files 148 may store healthcare transaction records associated with communications received from various healthcare provider computers 104 and/or various claims processor computers 108, 110. The data files 148 may also store any number of suitable routing tables that facilitate determining the destination of communications received from a healthcare provider computer 104 or claims processor computer 108, 110 and/or the destination of claims generated by the COB application 180. The host module 154 may receive, process, and respond to requests from the client module 138 of the healthcare provider computer 104, and may further receive, process, and respond to requests of the host modules 172, 192 of the various claims processor computers 108, 110. The service provider computer 106 may include additional program modules for performing other processing methods described herein. Those of ordinary skill in the art will appreciate that the service provider computer 106 may include alternate and/or additional components, hardware or software without departing from example embodiments of the invention.

A coordination of benefits (COB) application 180 or COB module may also be operative with the service provider computer 106. The COB application 180 may include computer-executable instructions for identifying and/or processing a bundled healthcare claim transaction that is received from a healthcare provider computer 104. For example, the COB application 180 may receive a healthcare claim request, a copy of a healthcare claim request, or information included in the healthcare claim request from the service provider computer 106, and the COB application 180 may determine whether the healthcare claim request is a bundled request. A wide variety of techniques may be utilized in this determination, such as reading an flag or identifier included in the healthcare claim request (e.g., an OCC code) or by determining whether information associated with multiple benefit providers or payors is included in the healthcare claim request.

It the COB application 180 identifies a received healthcare claim request or healthcare claim transaction as a bundled request, then the COB application 180 may parse or otherwise break up the bundled request into its components. For example, the bundled request may be parsed into a primary component and one or more secondary components. The COB application 180 may then generate and direct the communication of claim requests for one or more of the components in an attempt to adjudicate the bundled request. For example, the COB application 180 may generate a primary claim request and direct the service provider computer 106 to route or otherwise communicate the primary claim request to a first claims processor computer 108 associated with the primary claim request. A first adjudicated reply for the primary claim request may then be received by the service provider computer 106 from the first claims processor computer 108 and the first adjudicated reply, a copy of the reply, or information included in the reply may be communicated to the COB application 180. The COB application 180 may then generate a secondary claim request based at least in part on the information included in the first adjudicated reply, and the COB application 180 may direct the service provider computer 106 to route or otherwise communicate the secondary claim request to a second claims processor computer 110 associated with the secondary claim request. A second adjudicated reply for the secondary claim request may then be received by the service provider computer 106 from the second claims processor computer 110 and the second adjudicated reply, a copy of the reply, or information included in the reply may be communicated to the COB application 180. As desired, the COB application 180 may generate additional secondary requests in an iterative manner based upon the received adjudicated replies. The COB application 180 may continue to generate and/or route claim requests until all relevant claims included in the bundled request are paid or until no more claims processor computers are available. Once processing by the COB application 180 is complete, the COB application 180 may generate or construct a bundled reply to the bundled healthcare claim request based upon each of the received adjudicated replies, and the COB application 180 may direct the service provider computer 106 to route the bundled reply to the healthcare provider computer 104. As an alternative to generating a bundled reply, each of the received adjudicated replies may be communicated to the service provider computer 104.

In certain embodiments of the invention, the COB application 180 may construct a secondary claim request based upon information included in received adjudicated replies for one or more previous claim requests. In this regard, a requested claim amount or payment amount included in a secondary claim request may be based upon one or more payments that have been made or approved in conjunction with previously adjudicated claim requests for the healthcare transaction. For example, a primary claim request may be generated for a prescription medication and communicated to an appropriate claims processor computer 108 associated with an insurance provider. An adjudicated reply received for the primary claim request may indicate that all of the medication cost will be covered other than a patient co-payment amount, such as fifteen dollars ($15). A secondary claim request for the co-payment amount (e.g., fifteen dollars) may be generated for the prescription medication and communicated to an appropriate claims processor computer 110 associated with a government provider (e.g., a Medicaid provider) to request payment of the co-payment amount. Once an adjudicated reply is received for the secondary claim request, a bundled reply may be generated or built for communication to the healthcare provider computer 104.

As desired in various embodiments, if a claim request is denied by a claims processor computer 108 or if an expected payment amount is not made or authorized, then information included in the claim request may be utilized to generate a second claim request. For example, if a primary claim request is denied, then a secondary claim request may be generated using the primary claim request data or information. The secondary claim request may then be communicated to an appropriate claims processor computer for adjudication. This process may be repeated as desired until the claim is paid or until no other payors are available for the healthcare transaction. In this regard, if a first payor does not authorize payment for a claim, then a claim request may be sent to a second payor, third payor, and so on. For example, if a patient has two insurance providers and a first of the insurance providers denies a claim, then a claim request may be communicated to the second insurance provider in an attempt to have the claim approved. If the claim is ultimately approved, then one or more additional secondary claims may be generated as desired in the event that other claims processor computers are available. An example of operations for generating claim requests based upon the adjudicated replies received for one or more previous requests is provided below with reference to FIG. 4.

The data storage devices 182 (e.g., databases) may be accessible by the COB application 180, and the data storage devices 182 be operable to store healthcare claim transaction information, such as information that may be utilized by the COB application 180 to construct one or more claim requests and/or information (e.g., adjudicated replies) that may be utilized to generate or build a bundled reply for a healthcare claim request.

With continued reference to the service provider computer 106, the one or more I/O interfaces 144 may facilitate communication between the service provider computer 106 and one or more input/output devices, for example, one or more user interface devices, such as, a display, keypad, control panel, touch screen display, remote control, microphone, etc. that facilitate user interaction with the service provider computer 106. The one or more network interfaces 146 may facilitate connection of the service provider computer 106 to one or more suitable networks, for example, a local area network, a wide area network, the Internet, a cellular network, a publicly switched telephone network, a dedicated healthcare transactions network, any wired network, any wireless network, a combination of networks, etc. In this regard, the service provider computer 106 may communicate with other components of the system 100.

With continued reference to FIG. 1, any number of claims processor computers, such as a first claims processor computer 108 and a second claims processor computer 110, may be provider. The components of an example first claims processor computer 108, which may generally be referred to as a claim processor computer 108, will now be described. The claims processor computer 108 may be any suitable processor-driven device that facilitates receiving, processing, and/or fulfilling healthcare claim transactions and/or healthcare claim requests received from the service provider computer 106. For example, the claims processor computer 108 may be a processor-driven device associated with a pharmacy benefits manager (PBM), an insurer, a government payor, or a claims clearinghouse. As desired, the claims processor computer 108 may include any number of special purpose computers or other particular machines, application specific circuits, microcontrollers, personal computers, minicomputers, mainframe computers, servers, and the like. In certain embodiments, the operations of the claims processor computer 108 may be controlled by computer-executed or computer-implemented instructions that are executed by one or more processors associated with the claims processor computer 108 to form a special purpose computer or other particular machine that is operable to facilitate the receipt, processing, and/or fulfillment of healthcare claim transaction requests received from the service provider computer 106. The one or more processors that control the operations of the claims processor computer 108 may be incorporated into the claims processor computer 108 and/or in communication with the claims processor computer 108 via one or more suitable networks. In certain embodiments of the invention, the operations and/or control of the claims processor computer 108 may be distributed amongst several processing components.

Similar to other components of the system 100, the claims processor computer 108 may include one or more processors 158, one or more memory devices 160, one or more input/output ("I/O") interface(s) 162, and one or more network interfaces 164. The one or more memory devices 160 may be any suitable memory devices, for example, caches, read only memory devices, random access memory devices, magnetic storage devices, removable memory devices, etc. The one or more memory devices 160 may store data, executable instructions, and/or various program modules utilized by the claims processor computer 108, for example, data files 166, an operating system ("OS") 168, a database management system ("DBMS") 170, and a host module 172. The data files 166 may include any suitable information that is utilized by the claims processor computer 108 to process healthcare claim transactions, for example, patient profiles, patient insurance information, other information associated with a patient, information associated with a healthcare provider, etc. The operating system (OS) 168 may be a suitable software module that controls the general operation of the claims processor computer 108. The OS 168 may also facilitate the execution of other software modules by the one or more processors 158, for example, the DBMS 170 and/or the host module 172. The OS 150 may be, but is not limited to, Microsoft Windows®, Apple OSX™, Linux, Unix, or a mainframe operating system. The DBMS 170 may be a suitable software module that facilitates access and management of one or more databases that are utilized to store information that is utilized by the claims processor computer 108 in various embodiments of the invention. The host module 172 may initiate, receive, process, and/or respond to requests, such as healthcare claim transactions or claim requests, from the host module 154 of the service provider 106. The claims processor computer 108 may include additional program modules for performing other pre-processing or post-processing methods described herein. Those of ordinary skill in the art will appreciate that the claims processor 108 computer may include alternate and/or additional components, hardware or software without departing from example embodiments of the invention.

The one or more I/O interfaces 162 may facilitate communication between the claims processor computer 108 and one or more input/output devices, for example, one or more user interface devices, such as, a display, keypad, control panel, touch screen display, remote control, microphone, etc. that facilitate user interaction with the claims processor computer 108. The one or more network interfaces 164 may facilitate connection of the claims processor computer 108 to one or more suitable networks, for example, a local area network, a wide area network, the Internet, a cellular network, a publicly switched telephone network, a dedicated healthcare transactions network, any wired network, any wireless network, a combination of networks, etc. In this regard, the claims processor computer 108 may receive healthcare claim transactions and/or other communications from the service provider computer 106, and the claims processor computer 108 may communicate information associated with processing claim transactions to the service provider.

Other claims processor computers, such as the second claims processor computer 110, may generally include similar components to the first claims processor computer 108. For example, the second claims processor computer 110 may include one or more processors 181, one or more memory devices 183, one or more I/O interfaces 184, and/or one or more network interfaces 186. Each of these components may operate in a similar manner as the corresponding components described above for the first claims processor computer 108. Additionally, the one or more memory devices 183 may store data, executable instructions, and/or various program modules utilized by the second claims processor computer 110, for example, data files 190, an operating system ("OS") 188, a database management system ("DBMS") 191, and/or a host module 192, and each of these various components may be similar to those described above with reference to the first claims processor computer 108.

Any number of networks may be utilized in association with various embodiments of the invention to facilitate communications between any number of components of the system. The network(s) may also allow for real-time, off-line, and/or batch transactions to be transmitted between or among the healthcare provider computer 104, the service provider computer 106, and the claims processor computers 108, 110. Due to network connectivity, various methodologies as described herein may be practiced in the context of distributed computing environments. A wide variety of network configurations may be utilized as desired in various embodiments of the invention. Instead of or in addition to a network or combination of networks, dedicated communication links may be used to connect the various devices in accordance with an example embodiment of the invention. For example, the service provider computer 106 may form the basis of a network that interconnects the healthcare provider computer 104 and one or more claims processor computers 108, 110.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. For example, in one embodiment, the service provider computer 106 (or other computer) may be implemented as a specialized processing machine that includes hardware and/or software for performing the methods described herein. In addition, at least a portion of the processor and/or processing capabilities of the service provider computer 106 and/or the COB module 180, may be implemented as part of a claims processor computer, such as the first claims processor computer 108. Accordingly, embodiments of the invention should not be construed as being limited to any particular operating environment, system architecture, or device configuration.

Operational Overview

Figure 2:
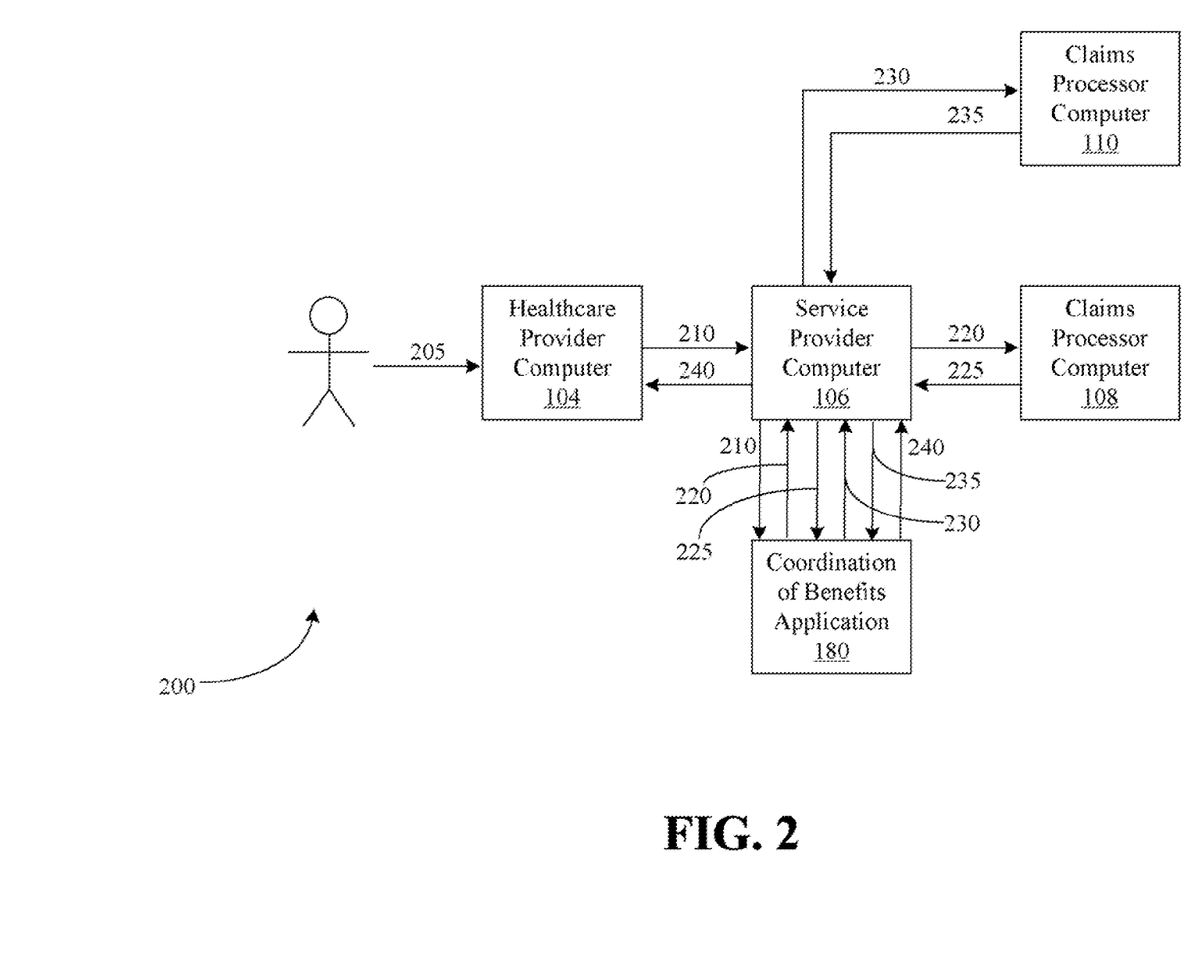
FIG. 2 is a diagram of one example data flow for coordinating benefits in healthcare claim transactions that are processed through a service provider, according to an illustrative embodiment of the invention.

FIG. 2 is a diagram of one example data flow 200 for coordinating benefits in healthcare claim transactions that are processed through a service provider, such as the service provider computer 106 illustrated in FIG. 1. With reference to FIG. 2, a healthcare provider computer, such as the healthcare provider computer 104 illustrated in FIG. 1, may receive a healthcare request 205 from a patient. The healthcare request 205 may be received in-person or electronically as desired in various embodiments of the invention. For example, a patient may seek to fill a prescription for one or more drugs, medications, and/or other products at a pharmacy location or store. As another example, a patient may communicate a healthcare request 205, such as a request to fill a prescription, to a healthcare provider computer 104 via one or more suitable network connections. For example, a purchase request may be communicated to a healthcare provider computer 104 from a customer computer via a web portal hosted by the healthcare provider computer 104.

The healthcare provider computer 104 may receive and process the request 205 to generate a healthcare claim transaction 210 or a healthcare claim request, such as a prescription claim request, and the healthcare claim transaction 210 may be communicated by the healthcare provider computer 104 to the service provider computer 106. The healthcare claim transaction 210 may be a bundled transaction that includes information associated with a plurality of claims and/or a plurality of payors for the healthcare claim transaction 210. Additionally, the bundled healthcare claim transaction 210 may include at least one identifier that facilitates the identification by the service provider computer 106 of the healthcare claim transaction 210 as a bundled claim transaction. A wide variety of identifiers may be utilized as desired in various embodiments of the invention, for example, a certain value (e.g., a value of nine) in an other coverage code (OCC) field for the healthcare claim transaction.

According to an example embodiment of the invention, the bundled healthcare claim transaction 210 may be in accordance with a version of a National Council for Prescription Drug Programs (NCPDP) Telecommunication Standard, although other standards may be utilized as well. As desired, the healthcare claim transaction 210 may include one or more Banking Identification Numbers (BINs) and/or Processor Control Numbers (PCNs) for identifying one or more appropriate claims processor computers, such as the claims processor computers 108, 110 illustrated in FIG. 1, as a destination for various components of the healthcare claim transaction 210. In addition, the healthcare claim transaction 210 may also include information relating to the patient, payor, prescriber, healthcare provider, and/or the prescribed drug or product. As an example, the healthcare claim transaction 210 received by the service provider computer 106 may include one or more of the following information:

Payor ID/Routing Information for each identified payor or potential payor BIN Number (i.e. Banking Identification Number) and Processor Control
    Number (PCN) that designates a destination of a primary component of the healthcare claim transaction 210 BIN Number(s) (i.e. Banking Identification Numbers) and Processor
    Control Number(s) (PCN) that designate a respective destination of one or more secondary components of the healthcare claim transaction 210

Patient Information
Name (e.g., Patient Last Name, Patient First Name, etc.)
Date of Birth of Patient
Age of Patient
Gender
Patient Address (e.g., Street Address, Zip Code, etc.)
Patient Contact Information (e.g., Patient Telephone Number)
Patient ID or other identifier
Primary Insurance/Coverage Information for a Primary Payor
Cardholder Name (e.g., Cardholder First Name, Cardholder Last Name)
Cardholder ID and/or other identifier (e.g., person code)
Prescriber Information
Primary Care Provider ID or other identifier (e.g., NPI code)
Primary Care Provider Name (e.g., Last Name, First Name)
Prescriber ID or other identifier (e.g., NPI code, DEA number)
Prescriber Name (e.g., Last Name, First Name)
Prescriber Contact Information (e.g., Telephone Number)
Pharmacy or other Healthcare Provider Information (e.g., store name, chain identifier, etc.)
Pharmacy or other Healthcare Provider ID (e.g., National Provider Identifier (NPI) code)
Secondary Insurance/Coverage Information for Each Secondary Payor
Cardholder Name (e.g., Cardholder First Name, Cardholder Last Name)
Cardholder ID and/or other identifier (e.g., person code)
Prescriber Information
Primary Care Provider ID or other identifier (e.g., NPI code)
Primary Care Provider Name (e.g., Last Name, First Name)
Prescriber ID or other identifier (e.g., NPI code, DEA number)
Prescriber Name (e.g., Last Name, First Name)
Prescriber Contact Information (e.g., Telephone Number)
Pharmacy or other Healthcare Provider Information (e.g., store name, chain identifier, etc.)
Pharmacy or other Healthcare Provider ID (e.g., National Provider Identifier (NPI) code)
Claim Information
Bundled Claim Identifier (e.g., OCC value)
Drug or product information (e.g., National Drug Code (NDC))
Prescription/Service Reference Number
Date Prescription Written
Quantity Dispensed
Number of Days Supply
Diagnosis/Condition
Pricing information for the drug or product (e.g., network price, Usual & Customary price)
Date of Service.

The service provider computer 106 may receive the bundled healthcare claim transaction 210 from the healthcare provider computer 104, and the service provider computer and/or an associated COB application, such as the COB application 180 shown in FIG. 1, may process the bundled healthcare claim transaction 210. As desired, the service provider computer 106 and/or the COB application 180 may perform one or more pre-edits on the healthcare claim transaction 210. For example, the bundled healthcare claim transaction 210 may be identified as a bundled transaction based upon the recognition of an appropriate identifier. Once the healthcare claim transaction 210 is identified as a bundled transaction, the healthcare claim transaction 210, a copy of the transaction 210, or information associated with the transaction 210 may be communicated to the COB application 180 for processing.

The COB application 180 may facilitate the generation and/or processing of a plurality of claim request for the bundled transaction 210. The COB application 180 may identify a plurality of payors (e.g., pharmacy benefits managers (PBM), insurers, government payors, and/or claims clearinghouses) for the bundled transaction 210, for example, by identifying payor identifiers included in the bundled transaction 210. The COB application 180 may also identify an order for submitting claims to the identified plurality of payors. In certain embodiments, the order for submitting claims may be identified based upon information included in the bundled transaction 210. For example, the bundled transaction 210 may identify a primary payor and one or more ordered secondary payors. In other embodiments, the order for submitting claims may be identified based on one or more prioritization rules that are applied by the COB application 180. A wide variety of prioritization rules may be utilized as desired. For example, a commercial insurance provider may be ordered before a government payor. As another example, the commercial insurance provider may be ordered before a supplemental insurance provider. As yet another example, information associated with previous healthcare claim transactions processed on behalf of the patient may be accessed from one or more suitable data storage devices, such as data storage devices 182 illustrated in FIG. 1, and an order utilized in a portion or all of the previous transactions may be utilized in the determination of an order for the bundled transaction 210.

The COB application 180 may generate or build a primary claim request 220 for the bundled transaction 210. The primary claim request 220 may include a portion of the information included in the bundled transaction 210, for example, information associated with the primary payor or primary insurance provider. The primary claim request 220 (or a copy of the primary claim request 220) may be communicated to a service provider computer 106 for routing or communication to an appropriate claims processor computer 108 associated with the primary claim request 220. The primary claim request 220 and/or a copy of the primary claim request 220 may then be routed or otherwise communicated by the service provider computer 106 to the appropriate claims processor computer 108 for adjudication. According to an example embodiment, the service provider 106 may utilize at least a portion of the information included in the primary claim request 220, such as a BIN/PCN, to determine the appropriate claims processor computer 108 to route the primary claim request 220 to. The service provider computer 106 may also include a routing table, perhaps stored in memory, for determining which claims processor computer to route the primary claim request 230 to.

The first claims processor computer 108 may receive and adjudicate or otherwise process the primary claim request 220. For example, the first claims processor computer 108 may determine benefits coverage for the primary claim request 220 according to an adjudication process associated with eligibility, pricing, and/or utilization review. The first claims processor computer 108 may transmit a first adjudicated reply 225 for the primary claim request 220 to the service provider computer 106. The service provider computer 106 may receive the first adjudicated reply 225 from the first claims processor computer 108. As desired, the service provider computer 106 may perform any number of post-edits on the adjudicated reply. For example, the service provider computer 106 may identify the first adjudicated reply 225 as an adjudicated reply associated with a bundled transaction, and the service provider computer 106 may communicate the first adjudicated reply 225 or a copy of the first adjudicated reply 225 to the COB application 180. A wide variety of various identifiers and/or identification techniques may be utilized by the service provider computer 106 to identify the first adjudicated reply 225 as an adjudicated reply associated with a bundled transaction, for example, identification of a claim number by the service provider computer 106.

The COB application 180 may receive the first adjudicated reply 225, and the COB application 180 may generate or build a secondary claim request 230 based at least in part on the information included in the first adjudicated reply 225. An amount paid or authorized for the first adjudicated reply 225 may be determined by the COB application 180 and the determined amount may be utilized in the generation of a secondary claim request 230. For example, if the first adjudicated reply 225 indicates that all but a co-payment amount (e.g., a $15 or $20 co-pay) has been paid or authorized, then the secondary claim request 230 may be generated to request a portion or all of the co-payment amount. As another example, if the first adjudicated reply 225 indicates that the primary claim request has been denied, then the secondary claim request 230 may be generated to request a portion or all of the claim amount that was included in the primary claim request 220. In this regard, the COB application 180 may attempt to obtain a highest possible payment for the bundled transaction 210.

The secondary claim request 230 (or a copy of the secondary claim request 230) may be communicated to service provider computer 106 for routing or communication to an appropriate claims processor computer 110 associated with the secondary claim request 230. The secondary claim request 230 and/or a copy of the secondary claim request 230 may then be routed or otherwise communicated by the service provider computer 106 to the appropriate claims processor computer 110 for adjudication. According to an example embodiment, the service provider 106 may utilize at least a portion of the information included in the secondary claim request 230, such as a BIN/PCN, to determine the appropriate claims processor computer 110 to route the secondary claim request 230 to. The service provider computer 106 may also include a routing table, perhaps stored in memory, for determining which claims processor computer to route the secondary claim request 230 to.

The second claims processor computer 110 may receive and adjudicate or otherwise process the secondary claim request 230. For example, the second claims processor computer 110 may determine benefits coverage for the secondary claim request 230 according to an adjudication process associated with eligibility, pricing, and/or utilization review. The second claims processor computer 110 may transmit a second adjudicated reply 235 for the secondary claim request 230 to the service provider computer 106. The service provider computer 106 may receive the second adjudicated reply 235 from the second claims processor computer 110, and the service provider computer 106 may identify the second adjudicated reply 235 as an adjudicated reply associated with a bundled transaction in a similar manner as that utilized for the primary claim request 220. The service provider computer 106 may communicate the second adjudicated reply 235 or a copy of the second adjudicated reply 235 to the COB application 180.

The COB application 180 may receive and process the second adjudicated reply 235. The COB application 180 may determine an amount paid or authorized for the second adjudication reply 235. In this regard, the COB application 180 may determine whether a total amount for the bundled transaction has been paid or authorized. If a total amount has not been paid or authorized for payment, then the COB application 180 may determine whether any additional claims processor computers are available. If an additional claims processor computer is available, then the COB application 180 may generate an additional secondary claim request (e.g., a third claim request) based upon the information included in the second adjudicated reply 235 and the first adjudicated reply 225. The additional secondary claim request may then be routed to a claims processor computer in a similar manner as that utilized to route the other claim requests 220, 230, and an adjudicated reply may be received for the additional secondary claim request. As desired, the COB application 180 may continue to generate or build claim requests until a maximum receivable or maximum available amount for the bundled transaction 210 is paid or authorized or until no more claims processor computers are available.

Once the adjudication of each component or portion of the bundled transaction 210 has been completed, the COB application 180 may generate or build a bundled transaction adjudicated reply 240 for the bundled transaction 210. The bundled reply 240 may be generated utilizing each of the adjudicated replies received from various claims processor computers. The bundled reply 240 or multi-claim reply may include a wide variety of information, for example, information associated with each of the claim requests that have been generated for the bundled transaction, information associated with each of the received adjudicated replies, payment information for the various claim requests, a total amount paid or authorized (if applicable), etc. The bundled reply 240 or a copy of the bundled reply 240 may be communicated to the service provider computer 106, and the service provider computer 106 may route or otherwise communicate the bundled reply 240 to the healthcare provider computer 104 as a response to the bundled healthcare transaction 210. As an alternative to communicating a single bundled reply 240, one or more of the received adjudicated replies may be communicated to the healthcare provider computer 104. These adjudicated replies may be communicated as a single communication or message or as any number of separate communications.

Figure 3:
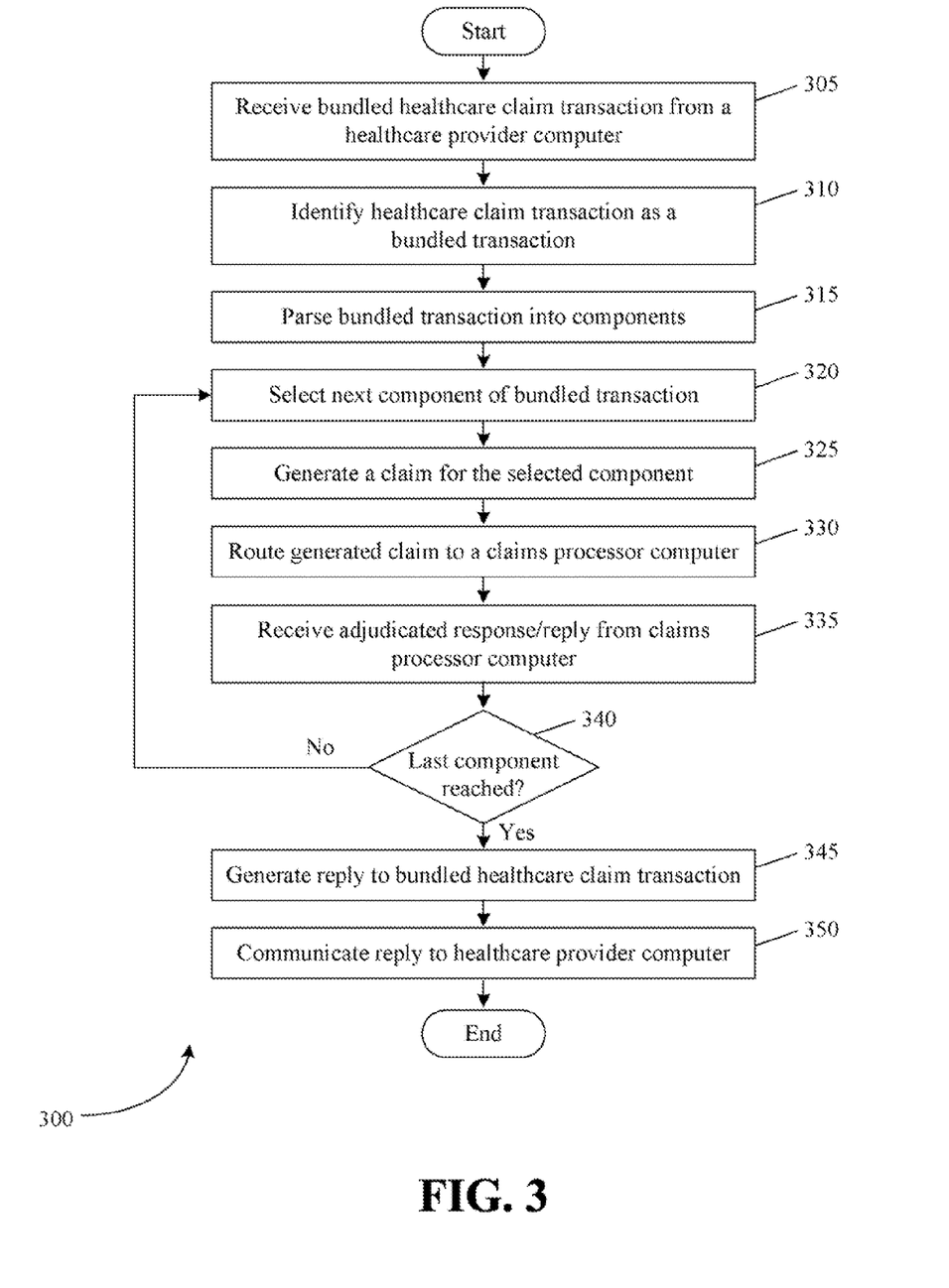
FIG. 3 is a flow chart of an example method for coordinating benefits in healthcare claim transactions, according to an example embodiment of the invention.

As described herein, healthcare transactions may be examined as they are routed to or through a service provider computer 106. In this regard, a bundled transaction may be identified and processed in real time as the bundled transaction is routed to or through the service provider computer 106. FIG. 3 is a flow chart of an example method 300 for coordinating benefits in healthcare claim transactions, according to an example embodiment of the invention. The method 300 may be performed by a suitable service provider computer and/or an associated coordination of benefits application, such as the service provider computer 106 and COB application 180 illustrated in FIG. 1. The method 300 may begin at block 305.

At block 305, the service provider computer 106 may receive a bundled healthcare claim transaction from a healthcare provider computer, such as the healthcare provider computer 104 illustrated in FIG. 1. The received bundled healthcare claim transaction may include information associated with a plurality of payors for a single healthcare transaction for routing by the service provider computer 106 to any number of appropriate claims processor computers, such as the claims processor computers 108, 110 illustrated in FIG. 1.

At block 310, the received bundled healthcare claim transaction may be identified as a bundled transaction or a bundled request. A wide variety of identifiers and/or identification techniques, such as the recognition of an other coverage code value (e.g., an OCC value of nine) or some other identifier, may be utilized to identify the received transaction as a bundled transaction or a bundled request. Once the received transaction is identified as a bundled request, the received transaction may be communicated to the COB application 180 for processing.

At block 315, The COB application 180 may receive the bundled transaction and parse or otherwise divide the bundled transaction into any number of individual components or parts. As desired, the COB application 180 may also rank or prioritize the components in the order in which they should be processed. The COB application 180 may then iteratively process each of the components of the bundled transaction until a maximum available payment amount is received or authorized for the bundled transaction or until no additional components are available.

At block 320, the next component of the bundled transaction may be selected. A claim request for the selected component may then be generated or built at block 325. The claim request may be generated utilizing information included in the bundled transaction, information included in previously generated claim requests for the transaction, and/or information included in adjudicated replies received for previously generated claim requests. In this regard, a claim request generated for a first component or primary component may be generated or built utilizing information included in the bundled transaction. Secondary claim requests generated for subsequent components may be generated or built utilizing information from the bundled transaction and/or adjudication information received for previous claim requests.

At block 325, the generated claim request may be routed or otherwise communicated to an appropriate claims processor computer, such as one of the claims processor computers 108, 110 illustrated in FIG. 1, for adjudication. The claims processor computer may adjudicate the healthcare claim transaction and communicate and adjudicated reply for the healthcare claim transaction to the service provider computer 106. The adjudicated reply may indicate whether or not the healthcare claim has been paid. Additionally, if the claim has been paid, the adjudicated reply may include payment information for the claim, including but not limited to, an amount paid or authorized by the claims processor and/or a designated patient pay amount (e.g., a patient co-pay amount).

The adjudicated reply may be received by the service provider computer 106 at block 335. At block 340, a determination may be made as to whether or not the last component of the bundled transaction has been reached or processed. If it is determined at block 340 that the last component has not been reached, then operations may continue at block 320 and the next component of the bundled transaction may be selected and processed. In this regard, the COB application 180 may generate a plurality of claims in a serial manner based upon the adjudication of previously processed claims. If, however, it is determined at block 340 that the last component has been paid or approved for payment, then operations may continue at block 345.

At block 345, a bundled reply to the bundled transaction may be generated or built based upon received adjudicated replies for each of the claim requests that were generated for respective components of the bundled transaction. The bundled reply may then be routed or otherwise communicated to the healthcare provider computer 104 by the service provider computer at block 350. As an alternative to generating and communicating a bundled reply, each of the received adjudicated replies may be communicated to the healthcare provider computer 104 in any number of suitable communications or messages.

The method 300 may end following block 350.

Figure 4:
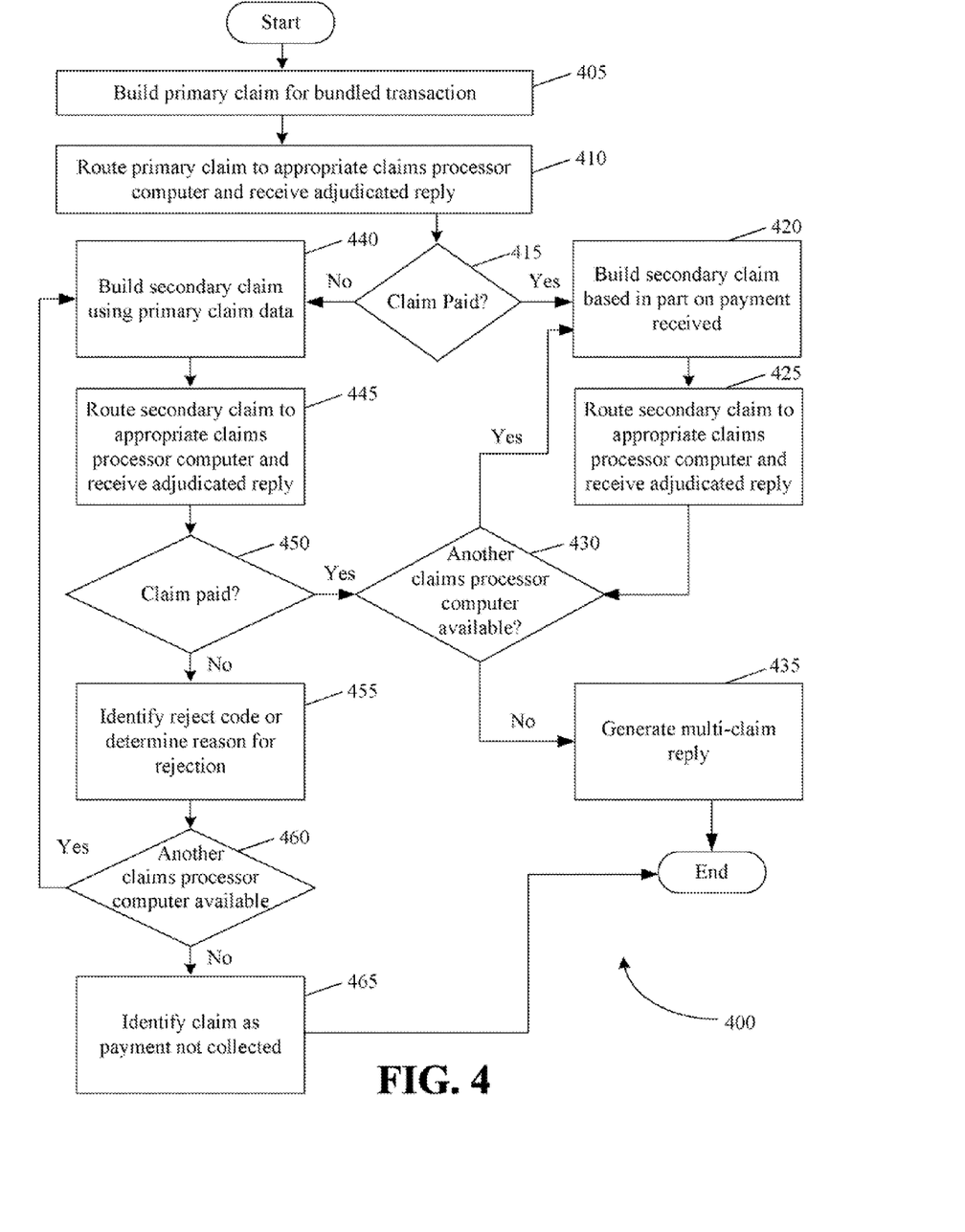
FIG. 4 is a flow chart of an example method for generating claim requests during the coordination of benefits in healthcare claim transactions, according to an example embodiment of the invention.

According to an aspect of the invention, a generated claim request for a bundled transaction may be based upon one or more previously adjudicated claim requests for the bundled transaction. FIG. 4 is a flow chart of an example method 400 for generating claim requests during the coordination of benefits in healthcare claim transactions, according to an example embodiment of the invention. The method may be performed by a suitable service provider computer and/or an associated coordination of benefits application, such as the service provider computer 106 and COB application 180 illustrated in FIG. 1. The method may facilitate the generation of a primary claim request and one or more secondary requests for a bundled healthcare transaction. The method may begin at block 405.

At block 405, a primary claim request may be generated or built for a bundled healthcare transaction received from a healthcare provider computer, such as the healthcare provider computer 104 illustrated in FIG. 1. The primary claim request may include a portion of the information included in the bundled transaction, for example, information associated with the primary payor or primary insurance provider. The primary claim request may additionally request payment for at least a portion of the bundled healthcare transaction. At block 410, the primary claim request may be routed or otherwise communicated to an appropriate claims processor computer associated with the primary claim request. The primary claim request may be adjudicated by the recipient claims processor computer, and an adjudicated reply for the primary claim request may be received at block 410.

At block 415, a determination may be made as to whether the primary claim request has been paid or approved for payment. If it is determined at block 415 that the primary claim request has not been paid, then operations may continue at block 440 which is discussed in greater detail below. If, however, it is determined at block 415 that the primary claim request has been paid, then operations may continue at block 420.

At block 420, a secondary claim request may be generated or built based at least in part on the payment that has been made or authorized for the approved primary claim request. For example, a remaining co-payment amount following payment of the primary claim request may be identified and the co-payment amount may be requested in the generated secondary claim request. As another example, a payment amount for the primary claim request may be subtracted from a total amount of the bundled transaction, and a portion or all of the remainder may be requested in the generated secondary claim request. At block 425, the secondary primary claim request may be routed or otherwise communicated to an appropriate claims processor computer associated with the secondary claim request. The secondary claim request may be adjudicated by the recipient claims processor computer, and an adjudicated reply for the secondary claim request may be received at block 425. Following the receipt of the adjudicated reply for the secondary claim request, a determination may be made as to whether the secondary claim request has been paid. If the secondary claim request has not been paid or if the amount paid for the secondary claim request does not satisfy a total outstanding amount for the bundled transaction, then one or more additional secondary claim requests may be generated.

For example, at block 430, a determination may be made as to whether another claims processor computer is available. If it is determined at block 430 that another claims processor computer is available, then operations may continue at block 420 and another secondary claim request may be generated based upon the adjudication of prior claim requests. If, however, it is determined at block 430 that another claims processor computer is not available, then operations may continue at block 435. At block 435, a bundled or multi-claim reply for the bundled transaction may be generated based upon the adjudication of each of the claim requests. As desired, the bundled reply may then be routed or otherwise communicated to the healthcare provider computer.

At block 440, which may be reached if it is determined at block 415 that the primary claim request has not been paid, a secondary claim request may be generated or built utilizing data for the rejected primary claim request. For example, the secondary claim request may request an entire amount for the bundled transaction or an amount minus a patient co-payment amount. The secondary claim request may be generated for submission to a different claims processor computer, for example, a different insurance provider or other payor. At block 445, the generated secondary claim request may be may be routed or otherwise communicated to an appropriate claims processor computer associated with the secondary claim request. The secondary claim request may be adjudicated by the recipient claims processor computer, and an adjudicated reply for the secondary claim request may be received at block 445.

Following the receipt of the adjudicated reply for the secondary claim request, a determination may be made at block 450 as to whether the secondary claim request has been paid. If it is determined at block 450 that the secondary claim request has been paid, then operations may continue at block 430 as discussed above. If, however, it is determined at block 450, that the secondary claim request has not been paid, then operations may continue at block 455.

At block 455, which may be optional in certain embodiments of the invention, a reject code may be identified for the secondary claim request or a reason for rejection or denial of the secondary claim request may be determined. A wide variety of rejection codes may be identified for the secondary claim request, for example, a code indicated that the provider is not covered, a code indicating that the patient is not covered, or a code indicating that the payment was not collected. Additionally, although the determination of a reject code is described above with reference to a rejected secondary claim request following the rejections of a primary claim request, it will be appreciated that a rejection code may be identified for any rejected claim request. These rejection codes may then be included in a generated bundled reply.

At block 460, a determination may be made as to whether another claims processor computer is available. If it is determined at block 460 that another claims processor computer is available, then operations may continue at block 440 and another secondary claim request may be generated utilizing the primary claim data. If, however, it is determined at block 460 that another claims processor computer is not available, then operations may continue at block 465. At block 465, the bundled transaction may be identified as a denied or unpaid claim transaction. A reply to the bundled transaction indicating that the claim is denied may be generated for communication to the healthcare provider computer 104. The generated reply may be a relatively simple reply identifying the claim as unpaid or, alternatively, may be a bundled or multi-claim reply that includes information associated with the adjudication of each of the generated claim requests.

The method 400 may end following block 435 or 465.

The operations described and shown in the methods 300, 400 of FIGS. 3 and 4 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 3 and 4 may be performed.

Accordingly, example embodiments of the invention can provide the technical effects of creating a system, method, and apparatus that coordinates benefits for healthcare claim transactions or healthcare claim request. Additionally, example embodiments of the invention can provide the technical effect of generating a plurality of claim requests for a single healthcare transaction for adjudication and the communication of a single reply to a healthcare provider computer. In this regard, claim errors on the part of healthcare providers may be reduced or prevented.

Various block and/or flow diagrams of systems, methods, apparatuses, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method, comprising:

receiving, from a healthcare provider computer by a service provider system comprising one or more computers, a healthcare claim request comprising information associated with a plurality of prescription claims for a single healthcare transaction;

identifying, by the service provider system, the received healthcare claim request as a bundled healthcare claim request;

generating, based at least in part upon identifying the received healthcare claim request as a bundled healthcare claim request and by the service provider system for delivery to a first claims processor computer identified utilizing information included in the received healthcare claim request, a primary claim request for the healthcare transaction;

communicating, by the service provider system, the generated primary claim request to the first claims processor computer for adjudication;

receiving, by the service provider system from the first claims processor computer, a first adjudicated reply for the primary claim request;

generating, by the service provider system for delivery to a second claims processor computer identified utilizing the information included in the received healthcare claim request and based at least in part on the received first adjudicated reply, a secondary claim request for the healthcare transaction;

communicating, by the service provider system, the generated secondary claim request to a second claims processor computer for adjudication;

receiving, by the service provider system from the second claims processor computer, a second adjudicated reply for the secondary claim request;

bundling, by the service provider system, the first adjudicated reply and the second adjudicated reply into a single response for the healthcare claim request; and communicating, by the service provider system to the healthcare provider computer, information associated with the first adjudicated reply and the second adjudicated reply, wherein communicating information associated with the first adjudicated reply and the second adjudicated reply to the healthcare provider computer comprises communicating the bundled single response to the healthcare provider computer.

2. The computer-implemented method of claim 1, wherein identifying the received healthcare claim request as a bundled healthcare claim request comprises identifying the received healthcare claim request as a bundled healthcare claim request based at least in part on an other coverage code included in the healthcare claim request.

3. The computer-implemented method of claim 1, further comprising:
parsing, by the service provider system, the received healthcare claim request into a plurality of components, wherein the primary claim request is generated based at least in part on a first of the plurality of components, and wherein the secondary claim request is generated based at least in part on a second of the plurality of components.

4. The computer-implemented method of claim 1, wherein receiving a first adjudicated reply comprises receiving a first adjudicated reply indicating that the primary claim request has been approved by the first claims processor computer, and further comprising:
identifying, by the service provider system, an amount paid for the first adjudicated reply; and
determining, by the service provider system, a second payment amount for the healthcare claim request based at least in part on the identified amount paid for the first adjudicated reply,
wherein generating the secondary claim request comprises generating the second claim request utilizing the determined second payment amount.

5. The computer-implemented method of claim 4, wherein determining a second payment amount comprises determining one of a secondary insurance payment amount or a patient payment amount.

6. The computer-implemented method of claim 1, wherein:
receiving a first adjudicated reply comprises receiving a first adjudicated reply indicating that the primary claim request has been rejected by the first claims processor computer, and
generating a secondary claim request comprises generating a secondary claim request utilizing at least a portion of the data included in the rejected primary claim request.

7. The computer-implemented method of claim 6, wherein receiving a second adjudicated reply comprises receiving a second adjudicated reply indicating that the secondary claim request has been denied by the second claims processor computer, and further comprising:
determining, by the service provider system, a reject code associated with the denial of the secondary claim request.

8. The computer-implemented method of claim 7, further comprising:
determining, by the service provider system, whether a third claims processor computer is available for adjudication of the healthcare claim request; and
generating, by the service provider system when it is determined that a third claims processor computer is available, a third claim request utilizing at least a portion of the data included in the primary claim request; or
identifying, by the service provider system when it is determined that a third claims processor computer is not available, the healthcare claim request as a denied healthcare claim request.

9. The computer-implemented method of claim 1, further comprising:
generating, by the service provider system, based at least in part on the second adjudicated reply, a third claim request;
communicating, by the service provider system, the generated third claim request to a third claims processor computer;
receiving, by the service provider system, a third adjudicated reply from the third claims processor computer; and
communicating, by the service provider system, information associated with the third adjudicated reply to the healthcare provider computer.

10. A system, comprising:
at least one memory operable to store computer-executable instructions; and
at least one processor configured to access the at least one memory and execute the computer-executable instructions to:
receive a healthcare claim request from a healthcare provider computer, the healthcare claim request comprising information associated with a plurality of prescription claims for a single healthcare transaction;
identify the received healthcare claim request as a bundled healthcare claim request;
generate, based at least in part upon identifying the healthcare claim request as a bundled healthcare claim request and for delivery to a first claims processor computer identified utilizing information included in the received healthcare claim request, a primary claim request for the healthcare transaction;
direct communication of the generated primary claim request to a first claims processor computer for adjudication;
receive, from the first claims processor computer, a first adjudicated reply for the primary claim request;
generate, for delivery to a first claims processor computer identified utilizing information included in the received healthcare claim request and based at least in part on the received first adjudicated reply, a secondary claim request for the healthcare transaction;
direct communication of the generated secondary claim request to a second claims processor computer for adjudication;
receive, from the second claims processor computer, a second adjudicated reply for the secondary claim request;
bundle the first adjudicated reply and the second adjudicated reply into a single response for the healthcare claim request; and
direct communication of information associated with the first adjudicated reply and the second adjudicated reply to the healthcare provider computer, wherein the information includes the bundled single response.

11. The system of claim 10, wherein the at least one processor identifies the received healthcare claim request as a bundled healthcare claim request based at least in part on an other coverage code included in the healthcare claim request.

12. The system of claim 10, wherein the at least one processor is further configured to execute the computer-executable instructions to:
parse the received healthcare claim request into a plurality of components;
generate the primary claim request based at least in part on a first of the plurality of components; and
generate the secondary claim request based at least in part on a second of the plurality of components.

13. The system of claim 10, wherein:
the received first adjudicated reply indicates that the primary claim request has been approved by the first claims processor computer; and
the at least one processor is further configured to execute the computer-executable instructions to:
identify an amount paid for the first adjudicated reply;

determine a second payment amount for the healthcare claim request based at least in part on the identified amount paid for the first adjudicated reply; and generate the secondary claim request utilizing the determined second payment amount.

14. The system of claim 13, wherein the second payment amount comprises one of a secondary insurance payment amount or a patient payment amount.

15. The system of claim 10, wherein:
the first received adjudicated reply indicates that the primary claim request has been rejected by the first claims processor computer; and
the at least one processor is further configured to execute the computer-executable instructions to generate the secondary claim request utilizing at least a portion of the data included in the rejected primary claim request.

16. The system of claim 15, wherein:
the received second adjudicated reply indicates that the secondary claim request has been denied by the second claims processor computer; and
the at least one processor is further configured to execute the computer-executable instructions to determine a reject code associated with the denial of the secondary claim request.

17. The system of claim 16, wherein the at least one processor is further configured to execute the computer-executable instructions to:
determine whether a third claims processor computer is available for adjudication of the healthcare claim request;
generate, when it is determined that a third claims processor computer is available, a third claim request utilizing at least a portion of the data included in the primary claim request; or
identify, when it is determined that a third claims processor computer is not available, the healthcare claim request as a denied healthcare claim request.

18. The system of claim 10, wherein the at least one processor is further configured to execute the computer-executable instructions to:
generate, based at least in part on the second adjudicated reply, a third claim request;
direct communication of the generated third claim request to a third claims processor computer;
receive a third adjudicated reply from the third claims processor computer; and
direct communication of information associated with the third adjudicated reply to the healthcare provider computer.

* * * * *